United States Patent Office

3,142,434
Patented July 28, 1964

3,142,434
ADHESIVE COMPOSITIONS
Aurelius Franklin Chapman, Wilmington, Del., assignor to E. I. du Pont de Nemours and Company, Wilmington, Del., a corporation of Delaware
No Drawing. Filed Feb. 11, 1959, Ser. No. 792,465
2 Claims. (Cl. 229—53)

This invention relates to bag manufacture, and more particularly to novel adhesive compositions for application in the manufacture of bags from oriented film of polyethylene terephthalate.

In the manufacture of bags for a continuous web of flat film, the film is first printed, i.e., coated, in those areas or lines in which the film is to be joined to form a bag, with a thermoplastic adhesive dispersed in a volatile solvent. This step is termed "contour printing." The printed film is then passed through a drying device to evaporate the solvent or solvents and is wound up in roll form. The printed film is subsequently unwound, overlapped along its longitudinal axis and passed through a bag-making machine which heat seals the overlapped film along the printed lines and then cuts the web into individual bags. Since the flat film can be printed with adhesive much faster than the film can be made into bags, it is customary to print the continuous film and wind it up in rolls for subsequent conversion into bags, rather than to attempt to slow down a press so as to synchronize it with the bag-making operation. Normally, one printing press can supply at least three bag-making machines.

If a hard adhesive is used, the seals of the fabricated bags will be brittle and will tear at or adjacent the seals during or after the loading of the bag. If a soft adhesive is used, contour printed film tends to block in roll form, i.e., the contiguous surfaces of the film in the roll adhere so tenaciously in the printed areas that the film cannot be unwound without pulling the adhesive away from printed areas or rupturing the film itself. In the fabrication of bags from oriented polyethylene terephthalate film the problem of providing a suitable adhesive is further complicated by the fact that only a limited number of adhesive compositions are effective in bonding surfaces of such film.

The primary object of this invention, therefore, is to provide adhesive compositions which are effective in bonding the surfaces of oriented polyethylene terephthalate film to like surfaces, and which are substantially free of the shortcomings and disadvantages noted hereinabove. Other objects will appear from the description which follows:

These objects are realized by the present invention which, briefly stated, comprises, as an adhesive composition for oriented polyethylene terephthalate film, a composition comprising essentially in uniform admixture (1) a linear copolyester derived essentially from ethylene glycol, 20 to 60 mol percent, based on the total amount of acids, of terephthalic acid, 15 to 50 mol percent of isophthalic acid and 10 to 65 mol percent of at least one acyclic dicarboxylic acid from the group consisting of suberic, azelaic, sebacic and adipic acids, and derivatives thereof, said linear copolyester having a relative viscosity within the range of from 1.3 to 7.0; (2) from 10% to 45% by weight, based on the weight of said linear copolyester, of an ester type plasticizer; (3) from 2% to 10% of solid particles of a solid which is chemically inert with respect to the constituents of the composition, said particles having a particle size within the range of 5–20 microns; and (4) from 0.5% to 5% of a waxy compound.

The linear copolyester is produced according to the general process described in U.S. Patent No. 2,465,319 by reacting ethylene glycol and a mixture of the dicarboxylic acids in the form of alkyl esters of the acids having 1–7 carbon atoms in the alkyl group, e.g., the dimethyl esters, under conditions effective to promote ester interchange to form the corresponding glycol esters, and thereafter heating the glycol esters under reduced pressure and in the presence of a polymerization catalyst to form the copolyester.

The relative viscosity of the linear copolyester is determined by dissolving exactly 0.6 gram of the copolyester in exactly 100 grams of meta cresol, reagent grade. The viscosity of the copolyester solution is then determined in an Oswald viscosimeter tube at 77° F. as is the viscosity of meta cresol alone used as a control.

$$\text{Relative viscosity} = \frac{\text{solution viscosity in seconds}}{\text{control viscosity in seconds}}$$

The preferred ester type plasticizer is triethyl citrate. As examples of other ester type plasticizers useful in the composition of this invention there may be mentioned tricresyl phosphate, tributyl citrate, etc. The plasticizer content of the composition may vary from 10% to 45% by weight, based on the weight of copolyester in the composition. The optimum amount of plasticizer will depend in each case, of course, upon the particular copolyester selected.

The operable, inert solid particle range is 2% to 10%, based on the weight of copolyester, with 5% being preferred. More than 10% decreases the seal strength and less than 2% results in blocking of the rolled up, contour-printed film. The preferred inert solid is silica. Other particles, e.g., starch, talc, clay, etc., which are inert to the remaining constituents of the adhesive and are in the range of 5–20 microns in size may be used.

While lauryl alcohol is preferred, other waxy compounds such as paraffin, stearyl alcohol, pentaerythritol tetrastearate, etc. may be employed. The waxy constituent should comprise from 0.5% to 5% by weight, based on the weight of the copolyester with a content of 1.5% being preferred.

The adhesive composition is most conveniently applied as a liquid composition comprising the essential ingredients of the adhesive composition dissolved and dispersed in a volatile organic liquid or mixture of liquids such as xylene, n-butyl acetate, methyl ethyl ketone, methyl isobutyl ketone, dioxane, tetrahydrofurane, etc., which may be subsequently removed by passing the contour-printed web through a drying zone, prior to winding it into a roll.

The following examples of preferred embodiments will serve to further illustrate the principles and practice of the invention. Parts are by weight unless otherwise indicated.

*Example 1*

30 parts of a copolyester having a relative viscosity of 1.6 prepared by reacting ethylene glycol with 33 mol percent dimethyl terephthalate, 17 mol percent dimethyl isophthalate and 50 mol percent dimethyl sebacate under ester-interchange conditions followed by polymerizing, were stirred together with 4.5 parts of triethyl citrate, 1.5 parts of "Syloid" 162 silica (10 micron silica, Davidson Chem.—W. R. Grace Co.) and 0.45 part of lauryl alcohol, into a volatile organic solvent mixture consisting of 32.9 parts of methyl ethyl ketone, 3.5 parts of methyl isobutyl ketone and 2.1 parts of xylene.

By means of a flexographic press this adhesive was printed on oriented, heat shrinkable polyethylene terephthalate film 0.0005" thick in a contour to give a round-bottom bag with a longitudinal center seal on one side. The printed film unwound nicely without any blocking and was fabricated into bags on a Simplex bag-making machine at a temperature of 350° F., ¼ second contact time and 20 p.s.i. pressure. The round-bottom bags thus produced had strong, flexible seals.

*Example 2*

A copolyester having a relative viscosity of 1.53 was made by reacting ethylene glycol with 40 mol percent dimethyl terephthalate, 40 mol percent dimethyl isophalate, 10 mol percent dimethyl sebacate and 10 mol percent dimethyl adipate. 30 parts of this copolyester were mixed as above described with:

| | Parts |
|---|---|
| Triethyl citrate | 9.0 |
| "Syloid" 162 silica | 1.5 |
| Lauryl alcohol | 0.45 |
| Cellosolve acetate | 70.0 |

This adhesive was non-blocking and gave good strong, flexible seals when used in both flat and round-bottom bags made of oriented polyethylene terephthalate film.

*Example 3*

30 parts of the copolyester of Example 2 were mixed with:

| | Parts |
|---|---|
| Triethyl citrate | 9.0 |
| "Syloid" 162 silica | 1.5 |
| Lauryl alcohol | 0.45 |
| Methyl ethyl ketone | 66.0 |
| Dioxane | 34.0 |

This adhesive printed on heat-shrinkable polyethylene terephthalate film as above described was non-blocking and gave good strong, flexible seals on oriented, heat-shrinkable polyethylene terephthalate film 0.005" thick.

*Example 4*

30 parts of the copolyester of Example 1 were admixed with:

| | Parts |
|---|---|
| Triethyl citrate | 4.5 |
| "Syloid" 162 silica | 1.5 |
| Lauryl alcohol | 0.45 |
| Ethyl acetate | 35.0 |
| Normal butyl acetate | 35.0 |

The resulting adhesive applied as in the previous examples was non-blocking and produced strong, flexible seals.

Adhesive compositions prepared from the constituents and in the proportion shown in Example 4, but using in place of the ethyl acetate, N-butyl acetate solvent mixture:

*Example 5*

| | Parts |
|---|---|
| Cellosolve acetate | 70 |

*Example 6*

| | |
|---|---|
| Methyl ethyl ketone | 66 |
| Dioxane | 34 |

*Example 7*

| | |
|---|---|
| Tetrahydrofurane | 70 | were printed on heat-shrinkable polyethylene terephthalate film as above described. In all cases the contour-printed film was free of blocking tendencies, and contour bags formed from the printed film on a Simplex bag-making machine exhibited strong, flexible seals.

*Example 8*

28.5 parts of the copolyester of Example 1 together with 1.5 parts of the copolyester of Example 2 were mixed with:

| | Parts |
|---|---|
| Triethyl citrate | 4.5 |
| "Syloid" 162 silica | 1.5 |
| Lauryl alcohol | 0.45 |
| Methyl ethyl ketone | 32.9 |
| Methyl isobutyl ketone | 35.0 |
| Xylene | 2.1 |

As in the previous examples, the adhesive composition yielded non-blocking contour-printed, heat-shrinkable polyethylene terephthalate film, and contour bag structures formed therefrom had strong, flexible seals.

The adhesive of this invention makes it possible to make contour bags (i.e., shaped) out of oriented films of polyethylene terephthalate which are normally not heat sealable or are adversely affected if heat sealed. The film can be readily printed with this adhesive using conventional equipment, and the printed film when dried does not cause the rolled-up, printed film to block before it is later unwound and converted into bags.

I claim:
1. Bag structures of oriented polyethylene terephthalate film having longitudinal side and bottom seams joined by an adhesive composition consisting essentially of (1) a linear copolyester obtained by the esterification and subsequent polymerization of ethylene glycol with 20 to 60 mol percent, based on the total amount of acids, of terephthalic acid, 15 to 50 mol percent of isophthalic acid, and from 10 to 65 mol percent of at least one acyclic dicarboxylic acid selected from the group consisting of suberic, azelaic, sebacic and adipic acids, said linear copolyester having a relative viscosity within the range of from 1.3 to 7.0; (2) from 10% to 45% by weight, based on the weight of said linear copolyester, of triethyl citrate; (3) from 2% to 10% of silica particles having a particle size within the range of 5–20 microns; and (4) from 0.5% to 5% of lauryl alcohol.

2. An adhesive composition suitable for adhering oriented film of polyethylene terephthalate consisting essentially of (1) 30 parts by weight of a copolyester of ethylene glycol with 33 mol percent of terephthalic acid, 17 mole percent of isophthalic acid, and 50 mol percent of sebacic acid, said polyester having a relative viscosity within the range of 1.3 to 7.0; (2) 4.5 parts of triethyl citrate; (3) 1.5 parts of silica particles having an average dimension of 10 microns; and (4) 0.45 part of lauryl alcohol all uniformly distributed in a volatile organic solvent mixture consisting of 32.9 parts of methyl ethyl ketone, 3.5 parts of methyl isobutyl ketone, and 2.1 parts of xylene.

References Cited in the file of this patent

UNITED STATES PATENTS

| 2,236,546 | Mitchell | Apr. 1, 1941 |
| 2,378,377 | Bare | June 19, 1945 |
| 2,683,100 | Edgar et al. | July 6, 1954 |
| 2,729,618 | Muller et al. | Jan. 3, 1956 |
| 2,865,891 | Michel | Dec. 23, 1958 |
| 2,894,932 | Bader et al. | July 14, 1959 |
| 2,897,732 | Shuger | Aug. 4, 1959 |
| 2,901,465 | Sample | Aug. 25, 1959 |
| 2,924,500 | Huffman et al. | Feb. 9, 1960 |